Jan. 5, 1965   R. S. JAY   3,164,255
MODULAR CANTILEVER ARM RACK
Filed April 26, 1962   2 Sheets-Sheet 1

INVENTOR.
RICHARD S. JAY
BY Dominik, Lazo & Worth
ATTORNEYS

Jan. 5, 1965   R. S. JAY   3,164,255
MODULAR CANTILEVER ARM RACK
Filed April 26, 1962   2 Sheets-Sheet 2

INVENTOR.
RICHARD S. JAY
BY
Dominik, Lago & Worth
ATTORNEYS

United States Patent Office 3,164,255
Patented Jan. 5, 1965

3,164,255
MODULAR CANTILEVER ARM RACK
Richard S. Jay, Evanston, Ill., assignor to Jarke Manufacturing Company, a corporation of Illinois
Filed Apr. 26, 1962, Ser. No. 190,459
19 Claims. (Cl. 211—60)

This invention relates to a modular cantilever arm rack. A rack of the character contemplated by the invention is advantageously used for storing elongated objects such as pipe, tube, rods, screw machine stock and the like. One aspect of the invention is to provide a storage facility for elongated objects which has a modular feature enabling the expansion and contraction of storage space according to the need therefor. The modular feature enables connecting or disconnecting like-constructed units in such fashion that a storage facility is provided of uniform structural characteristics. Another aspect of the invention is the provision of a storage facility having access to the stored object from both the side and the end. A further aspect is a storage facility allowing modifications in the vertical spacing or number of support arms or shelves.

A frequently recurring industrial problem is to adjust the storage facilities to the inventory which must be maintained. Inventory requirement can decrease drastically due to changes in products, an overriding demand for space by other activities of the industrial unit concerned, or intentional reduction in inventory to avoid the impact of local property taxes. On the other hand, increases in storage facilities arise in anticipation of shortages, volume purchases, contractual agreement to keep certain stock on hand, (e.g. tail pipes and mufflers) and changes in products Product changes may also alter the space required, i.e. support arms of shelves may have to be modified as to space and/or amount.

One object of the invention resides in the provision of a modular rack so constructed that storage facilities may be expanded or contracted by the respective addition or removal of like constructed portions, or modules, constituting the rack.

Another object is provision of a rack so constructed that modifications in shelf and/or support means spacing and/or quantity are readily accomplished.

In the storage of elongated members such as pipe, tube, screw machine stock, rods, bars, extruded sections, and other similarly constituted members, it is desirable to provide access to both the end and the side of the item stored. The end access permits one to see what cross section and shape is involved, and also permits removal by pulling a selected item longitudinally out of the rack. Side access provides a means for storing and removing the particular items being stored. Moreover, side access permits the storage of short pieces and the selection of particular short pieces which may be in storage.

One object of the invention is the provision of a storage rack suitable for the storage of elongated members.

A further object of the invention is a modular storage rack for the storage of elongated members and the like, whereby such racks may be increased in length to either accommodate longer members or to expand the storage facility involved by the addition of modular rack constituents, or alternatively to provide for a reduction in storage rack facilities by the remvoal of selected storage rack modules.

A further object of the invention is to provide a modular storage rack which includes a plurality of cantilever arms supported on column members whereby side and end access is facilitated.

The invention features a modular cantilever arm rack that includes first and second spaced apart column members, each column having a plurality of vertically arrayed keyholes or the like on one face and also having connecting means at the top and bottom of the face. Each of the connecting means constitutes a pair of horizontally spaced connector engaging means. Each of the connector engaging means is horizontally spaced the same distance from the center line of the face. A top and a bottom horizontally extending spacer element are respectively attached at both ends to the top and bottom connecting means which are on each column offset from the center line of the face toward the other of said column. A selected plurality of cantilever arms are removably mounted on the columns by engaging said keyholes. The cantilever arms advantageously have at least a portion of the upper side thereof extending in an upward direction. A base is attached to the bottom of each such column and extends in substantially the same direction as the cantilever arm, that is, outwardly from the face of each column. With the arrangement thus described, modular expansion of the rack is enabled by attaching other spacer elements to the remaining connecting means and extending them to other columns.

With the foregoing description it will be observed that one of the features of the modular construction is a column which is common to each of two modules, this being achieved by the arrangement of connecting means in pairs and offset equally from the center lines of the column faces. The equal offset enables the use of like-constructed spacer elements to the end that the modular construction employs the maximum amount of interchangeable parts.

A number of additional features may be included, either alone or in combination with the above described summary of the invention.

One such feature includes the use of cantilever arms having the upper surface thereof extending outwardly and upwardly whereby the parts stored are maintained close to the vertical axis of the particular storage facility.

Another feature is a modular cantilever arm rack where each column has two faces arranged on opposite sides thereof whereby the cantilever arms extend outwardly in opposite directions from the column. This enables storage on both sides of the column and also permits better balance of the load on the assembled modular rack. A further feature is a structure so arranged that a shelf means or pan may be supported on the cantilever arms in such fashion that short pieces may be stored. In this connection, it is to be understood that the ordinary employment of such racks comprehends the storage of elongated articles which rest on two or more cantilever arms which are arranged horizontally.

Another feature is a particular size relationship between the keyholes in the face of the column and the means on the cantilever arms which engage therewith, to the end that accidental dislodgement of the arms from the column is extremely difficult, while at the same time intentional assembly or disassembly is facilitated.

Other objects, advantages and features will become apparent from the following description when read in conjunction with the annexed drawings wherein.

Figure 1:
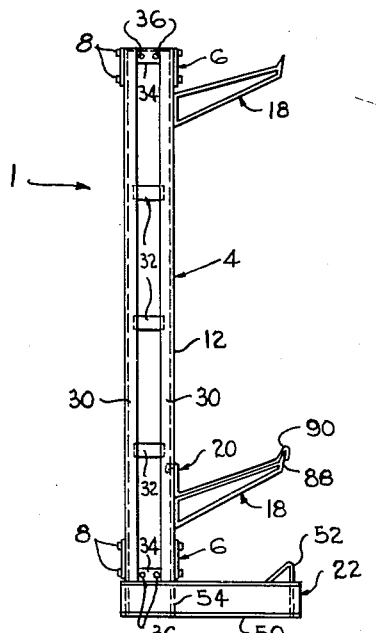
FIG. 1 is a side elevation of a single-arm modular cantilever arm rack.
Figure 2:
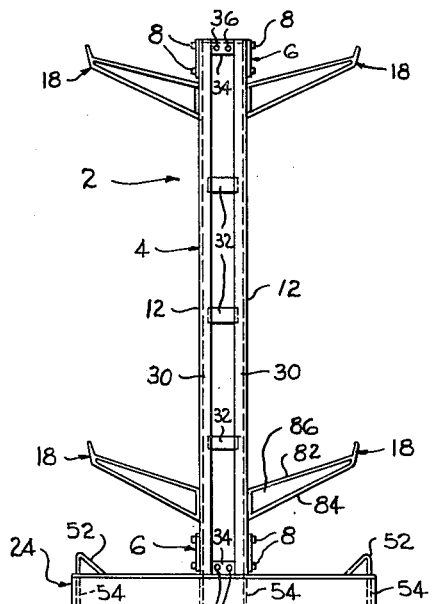
FIG. 2 is a side elevation of a double-arm cantilever arm rack of modular character.

Referring now to FIGS. 1 and 2, there is shown a single-arm embodiment 1 and a double-arm embodiment 2. The single-arm rack 1 is substantially similar to the double-arm embodiment, however, it has only one load carrying face on the column and a shortened base to permit placement against a wall. Preferably, prefabricated portions of the embodiments are welded together and the rack itself is assembled at the place of use using bolted construction and the like.

Both the single-arm and double-arm racks include a pair of columns 4 (see FIGS. 1–3) which are maintained in spaced apart relationship by horizontal spacer elements 6 secured to the top and bottom of the column faces by suitable fastening means such as the bolts 8 which pass through the elements and a corresponding connecting means on the column face. Advantageously, first and second sway braces 10 are arranged to extend diagonally from the bottom of one column to the top of the next adjacent column. The sway braces may have a tension adjusting means intermediate the length thereof in order to secure a rigid space frame arrangement when the rack is finally assembled. The face 12 of each column defines a plurality of keyhole-like apertures 14 which are arranged to engage the flanged stud 16 (FIG. 3) in order to secure the cantilever arms 18 against the column face. The single-arm column has the apertures 14 in only one face thereof, while the double-arm embodiment of FIG. 2 has the apertures in both faces in order to accommodate cantilever arms extending in both directions from the column. A pan 20 may be mounted between horizontally aligned cantilever arms on either of the embodiments of FIGS. 1 or 2, the pan being shown only in FIG. 1 by way of example.

To the bottom of the single-arm column is welded a single-arm base 22 which extends outwardly from the column in the same direction as the cantilever arm, but does not extend in the opposite direction, whereby the cantilever rack may be disposed against a wall. To the bottom of the columns of the double-arm embodiment 2 is welded a base 24 which extends from the face in the same directions as the arms 18 which protrude from both sides of the column.

Figure 3:
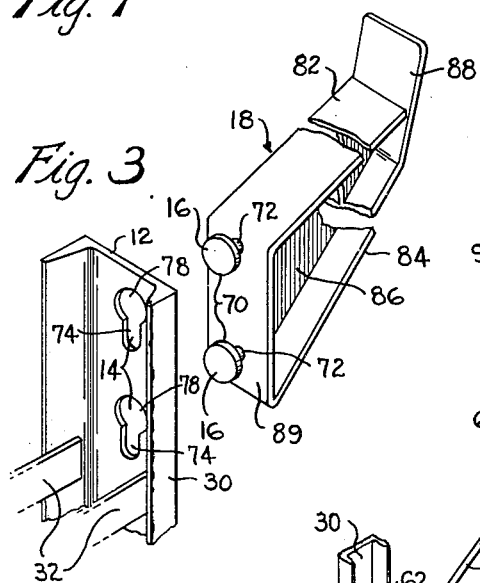
FIG. 3 is an exploded perspective representing the cantilever arm-to-column connection.
Figure 4:
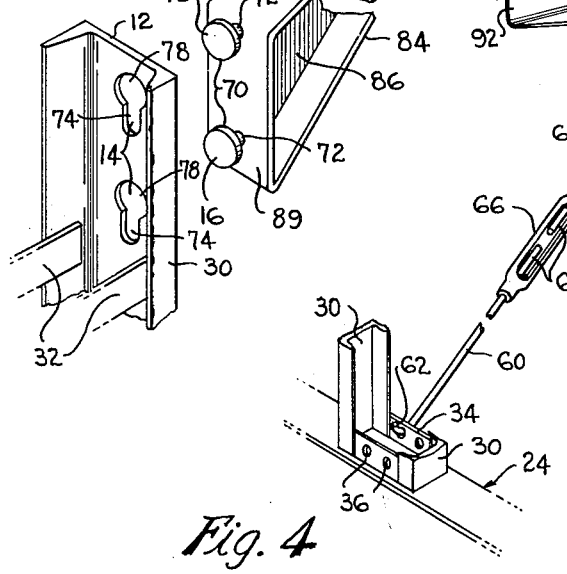
FIG. 4 is a perspective view of a sway brace arrangement advantageously employed in the preferred embodiments of the invention.

The foregoing describes the main structural components of a modular cantilever rack according to the invention. Details thereof will now be described. Generally speaking, the preferred construction contemplates builtup structural elements such as the columns 4 and horizontal spacers 6, both to economize on material and to reduce the weight of materials required in the interest of efficient use thereof. Referring now to FIGS. 1, 2 and 3, it will be seen that the columns 4 comprise two opposed channels 30 arranged with the channel webs facing outward to define the column faces 12. The channels are joined by a plurality of horizontal struts 32 which are welded to extend between the channel flanges. Top and bottom column struts 34 are disposed at the extremities of the column and have therein holes 36 as a means for engaging the sway braces 10 (see FIG. 4).

The horizontal spacer elements 6 preferably comprise a pair of laterally spaced apart angle members 40 which are spaced apart by lateral struts 42 which are preferably welded to the angles. At each end of each angle is welded a gusset plate 44 having therein a pair of bolt holes 46. The gusset plates 44 are spaced apart such that they can receive the column 4 therebetween and be in engagement with the faces 12 on opposite sides of the column. The top and bottom spacer elements 6 are preferably constructed alike.

Figure 6:
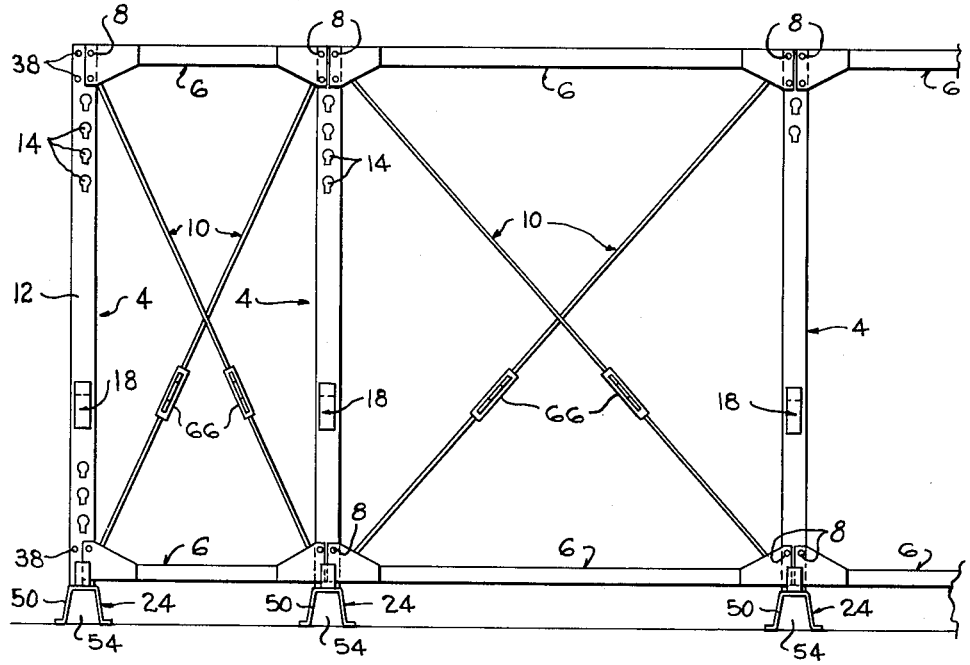
FIG. 6 is a front elevation view showing the common column feature whereby the modular nature of the construction is realized.
Figures 7, 8, 9, 10:
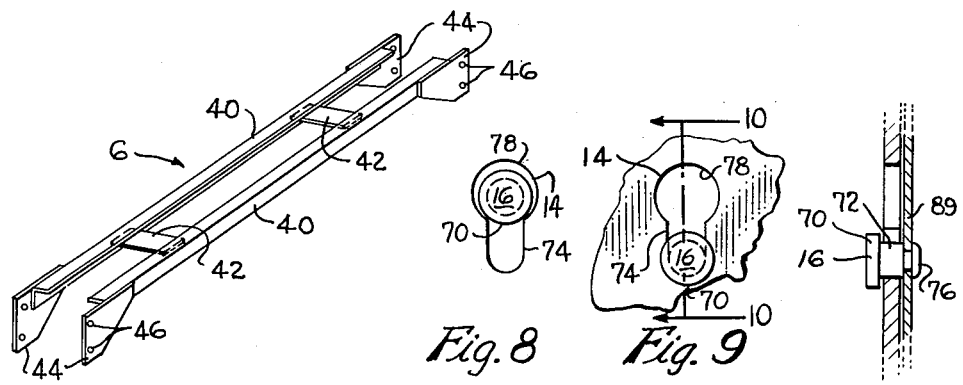
FIG. 7 is a perspective view of a spacer element suitable for application to either the top or the bottom of the modular cantilever arm rack.
FIGS. 8 and 9 are views taken from the rear of the column face showing the manner in which the cantilever arm stud engages, respectively, the upper and lower portions of the keyhole in the column face.
FIG. 10 is a side cross section view taken along the column center line, for example, along section 10—10 of FIG. 9.

As may be observed from FIG. 6, the spacer elements 6 may be arranged in top and bottom pairs of different horizontal lengths, whereby the columns 4 are provided with varying spacing, according to the dictates of the material to be stored and the available space. In this fashion can also be obtained fractional modules as far as width is concerned, while still retaining the maximum of interchangeability of parts. The gusset plates in all instances are, of course, constructed alike to this end.

Referring for a moment to FIG. 6, it will be observed that connecting means are provided at the top and bottom of the column 4 in the form of horizontally spaced pairs of bolt holes 38 which constitute connector (e.g. bolt, rivet or the like) engaging means. Preferably, at least two bolt holes are provided on each side of the center line of the column face, as the face is viewed in FIG. 6. The center line passes midway between the two pairs of bolt holes. In this fashion, mechanical interference between adjacent gusset plates of adjacent horizontal spacers 6 is eliminated, the overall length of the spacers 6 being such as to prevent overlap on the column face. Also, in this fashion, the modular construction is easily achieved.

The base 24 at the bottom of each column includes an elongated member 50 shaped like an inverted flanged channel. The flanges extend outwardly and are provided with bolt holes whereby the rack may be bolted to the floor. A "toe" 52 is welded to the upper face of the base channel 50 in order to provide additional storage space. Webs 54 are welded at selected intervals along the base channel 50 in order to impart rigidity thereto. The webs 54 may advantageously be formed integrally with the toe 52, or may constitute extensions of the channels 30 down into the base member.

The sway brace 10 advantageously comprises a pair of elongated tension rods 60. Each tension rod has a hook 62 on one end and a threaded section 64 on the other end. A turnbuckle 66 joins the two rods and enables adjusting the length and the tension therein, thereby to provide a rigid space frame when the sway braces are tightened properly.

One outstanding feature of the invention is the ability of the structure to permit adjusting the cantilever arms to desired heights in order to provide storage space of the size and amount desired by the user. To this end, the cantilever arms 18 are provided at their innermost end with a pair of vertically spaced apart flanged studs 16. The stud flanges 70 are furthest away from the back of the cantilever arm, as seen in FIGS. 3 and 8–10. The neck 72 of the studs is of such a size that it can engage the bottom 74 of the keyholes 14 and serve to connect the flange to the cantilever arm by some appropriate means such as a weld 76. The stud flange 70 is of a diameter less than the upper portion 78 of the keyholes. In the preferred embodiment, the diameter of the stud flange is from about 10 percent to about 14 percent less than the diameter of the enlarged keyhole portion 78 in order to obviate the dangers of accidental dislodgment. The most preferred embodiment employs a stud flange diameter of about 12 percent less than the diameter of the keyhole enlarged portion 78.

As is now evident from the arrangement of studs on the cantilever arm, the keyholes 14 are equally spaced apart in order to accommodate the cantilever arms at any place along the vertical height of the column. Moreover, the spacing of the keyholes 14 is equal to the spacing of the studs 16.

The preferred embodiment of the cantilever arm employs sufficient and well known I beam section. The lateral section of the cantilever arm (that is, as seen in FIGS. 1 and 2) is substantially triangular thereby obtaining an efficient distribution of material which is commensurate with the moment of the load applied to the cantilever arm. The arm is preferably constructed to extend upwardly and outwardly along its upward face. The cantilever arm comprises an upper flange 82, a lower flange 84, a web 86, a rear face 89 to which the studs 16 are attached and an outer upwardly extending retainer 88. If desired, other sections could be used such as a builtup box section or the like.

Figure 5:
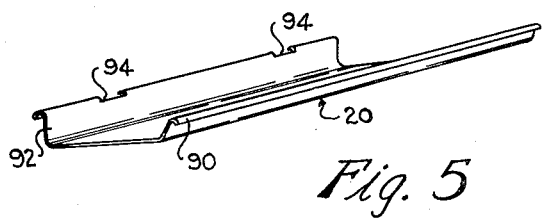
FIG. 5 is a perspective view of a pan or shelf means suitable for application to the preferred embodiments of the invention.

The pan 20 of FIG. 5 is advantageously formed from sheet metal and is bent on the forward edge to form the recess 90 in which may be received the retainer 88 of the cantilever arm (see FIG. 1). The rear edge 92 of the pan is formed to provide a plurality of notches 94 in order that the columns 4 may be fitted thereto. Where required, the notches are disposed at the extreme ends of the rear edge and may on occasion only be half a column wide. The entire pan is formed to lie on top of the arms, as seen in FIG. 1. The cross section of the pan is trough-like thus providing a storage space for parts too short to be suspended in simple beam fashion between two horizontally aligned but spaced apart cantilever arms. If desired, bins can be formed for small parts storage by the addition of ends to fill the space between the forward and rear edges 90, 92.

The cantilever arm 18 may be of different lengths. Where this is the case, the shorter arms are disposed at the upper end of the column thereby to enhance the stability of the structure when loaded and also to provide an advantageous load distribution. As best seen in FIGS. 1 and 2, the arms are so constructed and arranged that they extend outwardly and upwardly from the column, or at least the upper surface thereof extends outwardly and upwardly whereby elongated bodies stored on the cantilever arms are caused to roll back toward the column, thus enhancing the stability of the loaded rack.

The preferred material for constructing the rack is carbon steel. Other materials are suitable, stainless steel and aluminum, for instance. On occasion it may be desired to use a fiberglass reinforced resin. The rack and its constituents may be coated with a suitable paint or resin in order to provide the requisite rust resistance.

It is preferred to use welded construction throughout for the columns 4, the spacers 6, and the cantilever arms 18. It is also preferred to weld the bases 22, 24 to their respective columns. Other connecting means such as nuts and bolts or rivets may be used to secure the constituent parts of the columns, spacers and arms together, as long as the joint structures provide sufficient rigidity. The holes defined by the face of the column, such as the keyholes 14 and the bolt holes 38, may be formed in any suitable fashion as by punching, using a cutting torch, or the like.

In the preferred embodiment, a pair of vertically spaced apart flanged studs 16 are used as a means for engaging the cantilever arms with the load face 12 of the respective columns. The keyholes 14 are therefore spaced apart equally by an amount equal to the center-to-center spacing of the studs 16 whereby the arms may be disposed anywhere along the vertical height of the load face.

From the foregoing it will be apparent that the present invention provides a novel rack construction permitting modular expansion and contraction by the removal or addition of columns 4 and top and bottom spacers 6. The top and bottom spacers are so constructed in the preferred embodiments so as to be interchangeable one with another, as are the columns. The cantilever arms are disposable anywhere on the load faces of the columns and are interchangeable, in the preferred embodiment, with various ones of the columns. Moreover, the amount of storage space available on the cantilever arms may be modified by adding or subtracting pairs of arms to adjacent columns. The application of the sway braces 10 advantageously prevents the assembled columns and spacers from leaning sideways. When two or more columns are arranged in modular fashion, the load faces thereof are coplanar. It will be apparent from the preceding disclosure that the present rack construction is readily manufactured, easily assembled, will have long service life, and provides an economical facility for storage which is adaptable to the changing needs of the user.

Changes may be made in the combination and arrangement of parts or elements as heretofore set forth in the specification and shown in the drawings, it being understood that changes may be made in the precise embodiment shown without departing from the spirit and scope of the invention as defined in the following claims.

The invention claimed is:

1. A modular cantilever arm rack comprising a first and a second spaced apart column, each column having a face in which is defined a plurality of vertically arrayed keyholes and connecting means defined at the top and bottom of each face, each said connecting means having a pair of horizontally spaced connector engaging means, each of said connector engaging means being horizontally spaced the same distance from the center line of said face;

a top spacer and a bottom spacer each attached at its opposite end to those connecting means on each column which are offset from the face center line of each said column toward the other said column;

a plurality of cantilever arms removably mounted on each column by engaging said keyholes and having at least a portion of the upper side of each arm extending upwardly;

and a base attached to the bottom of each said column and extending outwardly from said face and being disposed below said bottom spacer;

all being arranged so that modular expansion of the rack is enabled by attaching other spacer elements to the remaining connecting means and extending such other elements to an added column and vertical rack storage space is changed by changing the number of cantilever arms.

2. A modular cantilever arm rack according to claim 1 wherein the upper surface of each of said cantilever arms extends outwardly and upwardly, thereby causing elongated bodies stored therein to roll back toward the column, thus enhancing the stability of the rack.

3. A modular cantilever arm rack according to claim 1 wherein each of said cantilever arms has a means for engaging said keyholes, said means comprising a flanged stud arranged with the flanged portion spaced apart from the portion of the arm which is disposed adjacent said column face.

4. A modular cantilever arm rack in accordance with claim 3 wherein the diameter of said flanged stud is in the range from about 10 to about 14 percent less than the diameter of the mating portion of said keyholes, whereby accidental dislodgment of the arm from the column is minimized while retaining the feature of a detachable connection of the arm to the column.

5. A modular cantilever arm rack in accordance with claim 3 wherein each of said cantilever arms has a pair of vertically arrayed flanged studs and wherein the keyholes on said column are equally vertically spaced, the spacing of the keyholes and the studs being such that a pair of keyholes are engaged by a pair of studs in the course of detachably connecting said cantilever arms to said columns.

6. A modular cantilever arm rack in accordance with claim 5 wherein the flanged portion of said stud is in the range from about 10 to about 14 percent less in diameter than the mating part of said keyholes, said keyholes being thereby sized for said flanged portion to pass therethrough at the keyhole upper end, and the keyhole lower ends being shaped and sized to have a dimension less than that of said stud.

7. A modular cantilever arm rack in accordance with claim 1 further comprising;
a sway brace extending from the bottom of said first column to the top of said second column.

8. A modular cantilever arm storage rack in accordance with claim 7 wherein said sway brace constitutes a tension member of adjustable length.

9. A modular cantilever arm rack according to claim 7 wherein said sway brace has a hook at each end thereof, each of said columns has a means for engaging one of said hooks, and said hooks are engaged with said means for engaging.

10. A modular cantilever arm rack according to claim 1 wherein said cantilever arms on each column are arranged in horizontal alignment with the cantilever arms on the other said column, and further comprising a pan mounted on a pair of horizontally spaced apart cantilever arms,
whereby objects having a length less than that between said arms may be stored on said pan.

11. A modular cantilever arm rack in accordance with claim 1 wherein each of said columns have faces on opposite sides thereof, and wherein the cantilever arms supported on each of said columns extend from both of the faces on each of said columns.

12. A modular cantilever arm rack in accordance with claim 1 wherein said base extends in only one direction outwardly of said column, and wherein said cantilever arms extend from said column face in only the same direction as said base extends.

13. A modular cantilever arm rack in accordance with claim 1 wherein said top and bottom spacer elements each comprise a pair of laterally spaced apart gusset plates disposed at each end thereof, said pair of plates being spaced apart by an amount sufficient to receive the column therebetween, including that portion of the column face having the connecting means,
whereby assembly in place is facilitated beacuse the spacer element can be slipped over the column members.

14. A modular cantilever arm storage rack assembly having at least two modules and comprising
first, second and third horizontally spaced apart columns, said second column being intermediate the others, each column having a face thereon defining a plurality of vertically arrayed cantilever arm support means lying intermediate connecting means disposed at the top and bottom of each said face, all of said faces being disposed in substantially coplanar relationship, each said connecting means constituting a pair of horizontally spaced apart fastener engaging means, the center line of each said face being disposed midway between the individual engaging means constituting each said pair;
first and second top spacer elements extending from said second column toward, respectively, said first column and said third column, each of said spacer elements being attached at its opposite ends to those connecting means lying between the face center lines of the two columns between which it extends;
first and second bottom spacer elements extending from said second column toward, respectively, said first column and said third column, each of said spacer elements being attached at its opposite ends to those connecting means lying between the center lines of the two columns between which it extends;
a plurality of cantilever arms detachably mounted on each of said columns by engaging said arm support means and having at least a portion of the arm upper side extending in an upward direction from the arm; and
a base attached to the bottom of each column and extending outwardly from the face thereof in the same direction that said arms extend said base being disposed below said bottom spacer;
all being arranged so that modular expansion of the rack is enabled by attaching other spacer elements to the remaining connecting means and extending them to additional columns.

15. A modular cantilever arm rack according to claim 14 wherein the upper surface of each of said cantilever arms extends outwardly and upwardly, thereby causing elongated bodies stored therein to roll back toward the column, thus enhancing the stability of the rack.

16. A modular cantilever arm rack in accordance with claim 14 wherein said arm support means comprise a plurality of keyholes, each cantilever arm has at least one flanged stud engageable with said keyholes, the diameter of said flanged stud being in the range from about 10 to about 14 percent less than the diameter of the mating portion of said keyholes, whereby accidental dislodgment of the arm from the column is minimized while retaining the detachable connection of the arm to the column.

17. A modular cantilever arm rack in accordance with claim 16 wherein the flanged portion of said stud is about 12 percent less in diameter than the mating part of said keyholes, said keyholes being thereby sized for said flanged portion to pass therethrough at the keyhole upper end, and the keyhole lower ends being shaped and sized to have a dimension less than that of said stud flanged portion.

18. A modular cantilever arm storage rack in accordance with claim 14 further comprising a sway brace extending from adjacent the intersection of one of said columns with one of said top spacer elements to adjacent the intersection of another of said columns with one of said bottom spacer elements, said sway brace constituting a tension member of adjustable length.

19. A modular cantilever arm rack in accordance with claim 14 wherein each of said columns have faces on opposite sides thereof, and wherein the cantilever arms supported on each of said columns extend from both of the faces on each of said columns.

References Cited in the file of this patent
UNITED STATES PATENTS

| | | |
|---|---|---|
| 767,101 | Brown | Aug. 9, 1904 |
| 806,677 | Keil | Dec. 5, 1905 |
| 1,380,570 | Lehman | June 7, 1921 |
| 2,103,484 | Meyer | Dec. 28, 1937 |
| 2,803,351 | Van Wiggeren | Aug. 20, 1957 |